United States Patent

Ismail

[15] 3,682,908

[45] Aug. 8, 1972

[54] METHOD OF PRODUCING HALOGENATED PHENOXY-S-TRIAZINES

[72] Inventor: Roshdy Ismail, Spich, Germany

[73] Assignee: Dynamit Nobel AG, Troisdorf (Bez. Cologne), Germany

[22] Filed: May 5, 1970

[21] Appl. No.: 34,900

Related U.S. Application Data

[63] Continuation of Ser. No. 737,129, June 14, 1968, abandoned.

[30] Foreign Application Priority Data

June 15, 1967 Germany .................. D 53345

[52] U.S. Cl. ............................................260/248 CS
[51] Int. Cl. ...............................................C07d 55/50
[58] Field of Search ................................260/248 CS

[56] References Cited

UNITED STATES PATENTS

| | | | |
|---|---|---|---|
| 3,049,542 | 8/1962 | Rose et al. | 260/248 |
| 3,407,201 | 10/1968 | Luethi et al. | 260/248 |
| 3,415,824 | 12/1968 | Biland et al. | 260/248 |

*Primary Examiner*—John M. Ford
*Attorney*—Burgess, Dinklage & Sprung

[57] ABSTRACT

Production of halogenated phenoxy-s-triazines by the reaction of halogenated phenols and C-chlorides of s-triazines in the presence of catalytic quantities of tertiary amine or carbonamide compounds or quaternary ammonium salts thereof.

10 Claims, No Drawings

METHOD OF PRODUCING HALOGENATED PHENOXY-S-TRIAZINES

This application is a continuation of application Ser. No. 737,129, filed June 14, 1968, now abandoned.

The object of the present invention is a method of producing halogenated phenoxy triazines from halogenated monohydric phenolic compounds and C-chlorides of s-triazine. The method is particularly characterized by the fact that the C-chlorides of the triazines are reacted with the halogenated monohydric phenolic compounds in the presence of catalytic quantities of tertiary amines whose amino group may possibly be a part of an aromatic ring system, and/or possibly N-mono- or -disubstituted acid amides, possibly in solvents, at a temperature of 50°–250° C and preferably 80°–200° C.

The preparation of phenyl esters of halogenated phenols of cyanuric chloride is described in J. Am. Chem. Soc. 73, 1959, pp 2992 et seq. The preparation is based on the reaction of cyanuric chloride with the alkali salts of the halogenated phenols in acetone-aqueous medium. The disadvantages of this method are as follows:

1. The use of large quantities of alkali;
2. After termination of the reaction, the final product must be washed out with large quantities of water in order to completely remove NaCl;
3. The drying of the final product requires a long drying time for complete removal of the water;
4. Furthermore, this reaction is also very incomplete so that large quantities of unreacted starting compounds must thereupon be separated from the final products.

It is, therefore, an object of this invention to provide an improved method of producing halogenated phenoxy-s-triazines.

It is another object of this invention to provide an improved catalyst for the reaction of halogenated phenols with C-chloro-s-triazines.

Other and additional objects of this invention will become apparent from a consideration of this entire specification, including the claims hereof.

In accord with and fulfilling these objects, one aspect of this invention is the improvement in the reaction of halogenated phenols with C-chloro-s-triazines to produce halophenoxy-s-triazines by catalysis of such reaction with tertiary amines, acid amines, or quaternary ammonium salts thereof.

It has been found that the disadvantages noted above can be avoided in accordance with the present invention by carrying out the method for the preparation of halogenated phenoxy-s-triazines in the manner that the C-chlorides of the s-triazine are reacted with the halogenated monohydric phenolic compounds in the presence of catalytic quantities of tertiary amines whose amino group may be a part of an aromatic ring system, and/or possibly N-mono- or -disubstituted acid amides, possibly in inert solvents, at temperatures of 50°–250° C and preferably of 80°–200° C. The chlorides of s-triazine and their derivatives react surprisingly readily with halogenated phenolic compounds, splitting off HCl, in the presence of catalytic quantities of the said tertiary amines, etc. In the same manner as the tertiary amines, and possibly N-mono- or-disubstituted acid amides, there are also useful as catalysts the quaternary salts thereof with hydrochloric acid, acetic acid, halogenated phenolic compounds, etc.

The reaction in accordance with the present invention is preferably carried out at normal, e.g. atmospheric, pressure. However, it can also be carried out at a pressure of up to about 12 atmospheric gauge.

For the preparation of the halogenated phenoxy-s-triazines, the C-chlorides of s-triazine and the halogenated phenols are preferably used in stoichiometric ratio, i.e., 1 mole of halogenated phenol is used per mole of s-triazine chloride. However, higher or lower ratios can be provided, if desired.

For the carrying out of the method in accordance with the invention there are suitable individual and mixed tertiary amines having aliphatic, cycloaliphatic and aromatic radicals or their mixtures, in which connection substituted imines are to be understood in accordance with the present invention as within the meaning of cyclic tertiary amine. Exemplary tertiary amines having aliphatic radicals are, for instance, trimethylamine, triethyl-amine, triisopropylamine, triisobutylamine, monoethyl diisopropyl-amine, monoethyl-di-n-butylamine, tri-n-butylamine, N,N,N',N'-tetramethyl butane diamine-(1,4), and N,N,N',N'-tetramethyl ethylene diamine. Also included are tertiary, aliphatic amines containing heterosubstituents. These are exemplified by $\beta$-chlorpropyl di-propylamine, tris-($\beta$-ethoxy ethyl)-amine, methylaminoacetonitrile, N,N-di-n-butylaminoacetonitrile, N,N-diisopropylaminoacetonitrile, N,N-butyl-N-methylaminoacetonitrile, methyleneaminoacetonitrile, N,N-diisobutylaminopropionitrile, $\beta$-dimethylaminoproprionitrile, dimethylaminoacetonitrile, and dimethyl-p-aminobenzonitrile. From the group of amines with cycloaliphatic radicals, N,N-dimethyl cyclohexylamine can be mentioned as example. Furthermore, other suitable amines with aromatic radicals are included, such as N,N-dialkylaniline (N,N-dimethylanilin, N,N-diethylaniline, etc.), p-bromophenyl dimethylamine, 2,4-dinitrophenyl di-methylamine, benzyl dimethylamine, p-nitrophenyl-di-n-butylamine, N-(2,4-dichlorphenyl)-diethylamine, N,N,N',N'-tetramethyl benzidine, etc. Suitable heterocylcic tertiary amines are, for instance, N-alkyl- or N-aryl-morpholines, such as N-n-butylmorpholine, N-phenylmorpholine, N-(p-methylphenyl)-morpholine, morpholinoacetic acid-morpholide; N-aryl- or N-alkyl-tetrahydroquinolines, or tetrahydroisoquinolines, such as N-n-propyl-tetrahydroquinoline, N-phenyl-tetrahydroisoquinoline; N-alkyl- and N-aryl-pyrrolidines and their derivatives, for instance, N-methyl-pyrrolidine, N-n-butyl-pyrrolidine, N-phenyl-pyrrolidine, etc. Aromatic tertiary amines are furthermore exemplified by pyridine, isoquinoline, pyrazine, oxazine, quinazoline, oxazol, oxdiazol, benthiazol, etc. Tertiary amines which additionally contain at least one nitrile group have proven particularly suitable for the carrying out of the method of the present invention.

N-mono- or -disubstituted acid amides useful in this invention are exemplified by those which are the carbonamides of monobasic aliphatic, aromatic and araliphatic carboxylic acids having about one to 18 carbon atoms. The said monobasic acids, such as formic acid, acetic acid, propionic acid, butyric acid, caproic acid, 2-ethyl-hexanoic acid, caprylic acid, lauric acid, palmitic acid, stearic acid, benzoic acid, phenylacetic acid and phenyl-butyric acid may be straight-chained or branched or have the alkyl chain interrupted also by a keto group, such as in pyruvic acid, acetoacetic acid or levulic acid. The amine part of such amides are exemplified by ammonia or mono- or diamines. There are preferred primary or secondary mono- or diamines which are derived from the saturated aliphatic, araliphatic, cycloaliphatic series or from the aromatic series with only one aromatic ring. By way of example, mention may be made of such amines as methylamine, dimethylamine, di-n- or -i-propylamine, di-n- or -isobutylamine, di-2-methyl-hexylamine, dilaurylamine, ethylene diamine, tetramethylene diamine, hexamethylene diamine, cyclohexylamine, dicyclohexylamine, benzylamine, dibenzylamine, aniline, methylaniline, toluidine, phenylene diamine and hexahydrophenylene diamine. One or both alkyl groups of the amines can also be replaced or substituted by the phenol or toluyl radical or by cycloalkyl groups having about five to six ring carbon atoms, which groups or rings may possibly further be substituted by alkyl groups, and particularly one or two methyl groups. Of the diamines which are particularly suitable as amine component for the preparation of the acid amides of this invention there may be mentioned in particular those in which the amine groups are separated by about one to 8 methylene (including aromatic CH) groups. In the case of the diamines also, the hydrogen atoms still bound to the nitrogen atom can be replaced, except for at least one thereof, for instance by alkyl groups having about one to four carbon atoms, a phenyl or toluyl radical or a 5- to 6-member cycloalkyl radical. As representatives of particularly suitable carbonamides which are used as catalysts in accordance with the invention, the following may, in particular, be mentioned:

Formamide, methylformamide, dimethylformamide, diethyl-formamide, acetamide, N,N-dimethylacetamide, N,N-di-n- or -i-propyl-butyramide, N,N-di-n- or -isobutylbutyramide, N-benzyl-butyric acid amide, N,N-dipropylethyl hexanoic acid amide, acetoacetic acid-N,N-di-n-butylamide, acetoacetic acid anilide, benzoic acid benzylamide, N,N-dimethyl benzoic acid amide and N,N'-diformyl hexamethylene diamine. Cyclic acid amides or imides can also be used.

Barbituric acids, unsubstituted or which may be substituted by hydrocarbon radicals, particularly by methyl-bis-n- or -isobutyl or phenyl groups, such as dimethyl barbituric acid, diethyl barbituric acid, dipropyl barbituric acid, diallyl barbituric acid, di-n-butyl barbituric acid and phenylethyl barbituric acid have been found to be useful catalysts for this reaction.

It is not necessary to use preformed amides directly as the catalyst for this reaction. Alternatively, the catalyst amide can be formed in situ by adding the components from which they are synthesized. For instance, a mixture of a primary or secondary mono- or diamine of the aforementioned type and one of the said monocarboxylic acids or the acid chlorides or anhydrides derived from said acids can be added to the reaction mixture since the desired catalytic acid amides are then formed under the reaction conditions.

Sulfonamides, such as 4-sulfamoyl-acetaniline, N'-amidino-sulfanilamide and N'-2-pyridyl-sulfanilamide are also suitable catalysts.

Phosphorous acid amides, such as hexamethyl phosphorous acid amide, hexamethyl phosphoric acid amide, hexa-n-butyl phosphorous acid amide or hexa-isobutyl phosphorous acid amide, phosphorous acid trimorpholide can also be used as catalysts. Phosphoric acid triamides can also be employed as catalysts, but their catalytic effect is somewhat inferior to that of phosphorous acid amides.

Titanic acid amides and stannic acid amides, such as di-propoxy titanium diamide and di-n-isobutyl tin diamide or di-isobutyl tin diamide can also be used as catalysts.

Mixtures of the aforementioned tertiary amines and acid amides can, of course, also be used as catalysts.

The tertiary amines and acid amides employed as catalysts are used in quantities of 0.1–20 mol percent and preferably 0.1–2 mol, referred to the moles of the triazine chloride.

Under the conditions in accordance with the invention, the condensation takes place rapidly with the separation of practically stoichiometric quantities of gaseous HCl. This advantage is shown by the following comparison of two experiments:

The reaction of pentachlorophenol, with cyanuric chloride in xylene takes place so slowly that only about 10% HCl is split off within 24 hours. Under the same reaction conditions, in the presence of tertiary amines as catalysts, about 98% HCl is split off within the first 3 hours of reaction.

The reaction should be carried out in the liquid phase. This includes both molten reaction mixture and solutions. The inert solvent can be either a true solvent and a dispersant medium. Suitable solvents within the meaning of the present invention are those which are substantially inert both to the reactants and reaction product under the reaction conditions. These include both aliphatic and aromatic hydrocarbons, substituted hydrocarbons and linear or cyclic ethers are also useful. As aliphatic hydrocarbons there may be mentioned both individual compounds and mixtures thereof, such as isooctane and benzene fractions, for instance those having a boiling range of 120°–200° C. Cycloaliphatic compounds, such as decahydronaphthaline can also be used. Benzene, toluene, xylene, o-dichlorbenzene and nitro-benzene are examples of suitable aromatic solvents. As esters which are suitable for the carrying out of the reaction, mention may be made of diisopropyl ether, diisoamyl ether, dimethyl ethers of ethylene or diethylene glycol, diphenyl ether, 1,4-dioxan, etc. The above list of suitable ethers shows that both open chain and cyclic ethers can be employed. Polar solvents, such as dimethyl sulfoxide and dimethyl formamide can also be used.

As the aromatic reactant for the carrying out of the method of the method of the invention, there are suitable halogenated, monohydric phenolic compounds which can be generally referred to as phenols. These phenols may have alkyl, particularly lower alkyl, substituents thereon.

Suitable halogenated monohydric phenolic compounds are, for instance, the fluorinated phenols, such as 4-fluorophenol, pentafluorophenol, the chlorinated phenols, such as 2-, 3-, 4-chlorophenols, 2,3-, 2,4-, 2,5-, 2,6-, 3,4-, 3,5- dichloro-phenols, 2,4-dichloro-6-methylphenol, 2,6-dichloro-4-tert.-butylphenol, 2,3,5-, 2,4,5- and 2,4,6-trichlorophenols, 2,3,4,6-tetrachlorophenol, as well as pentachlorophenol, the brominated phenols, such as 2-, 3-, 4-bromophenols, 2,4-, 2,6-dibromophenols, 2,4,6-tribromophenol and pentabromophenol, and the iodated phenols, such as 2,4-, 2,6-diiodophenols and 2,4,6-triiodophenol. However, halogenated naphthols and heterocycles of a phenolic character can also be used, such as 1-hydroxy-2,4-dibromonaphthaline and 8-hydroxy-5,7-dibromoquinoline. In addition to alkyl groups, the said monohydric phenolic compounds can also bear alkoxy, carboxy, and phenoxy groups as substituents. Of course, mixtures of the said halogenated phenols can also be used in accordance with the invention.

The trizine reactants used in accordance with the invention are compounds which are derived from the following basic substance:

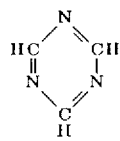

In this basic substance, at least one hydrogen atom is replaced by a chlorine. However, up to 3 hydrogen atoms can be replaced by chlorine. One or two hydrogen atoms can be furthermore replaced by identical or different amine radicals of the following general formula:

and/or aryloxy radicals, e.g. lower alkoxy.

In this formula:

$R^1$ can be hydrogen or an alkyl or cycloalkyl radical, possibly halogenated, $R^2$ can be an alkyl or cycloalkyl radical, possibly halogenated, or an aryl radical, And $R^1$ and $R^2$ can also jointly be a member of a heterocyclic ring system.

Suitable C-chlorides of s-triazine are, for instance, cyanuric chloride, 2-anilido-4,6-dichloro-s-triazine, 2,4-di-(di-ethylamino)-6-chloro-s-triazine, 2-n-butylamino-4,6-dichloro-s-triazine, 2-cyclohexylamino-4,6-dichloro-s-triazine, 2-n-octyl-amino-4,6-dichloro-s-triazine, 2-morpholino-4,6-dichloro-triazine, 2-ethoxyethylamino-2,4-dichloro-s-triazine, 2-piperidino-2,4-dichloro-s-triazine, and 2-α-naphthylamino-2,4-dichloro-s-triazine, etc.

The compounds prepared in accordance with the invention, in view of their fire-retarding, fungicidal, phytotoxic, bactericidal and in part also insecticidal properties, can also be used as water-repelling agents, parting agents, sizes for glass fabrics, textile adjuvants and for surface treating agents.

Various embodiments of the method of the invention are illustrated by the following examples.

EXAMPLE 1

2-anilido-4,6-di-(pentachlorophenoxy)-s-triazine

In a three-neck bottle provided with agitator, condenser and feed tube, 24.1 g of 2-aminido-4,6-dichloro-s-triazine and 53.3 g of pentachlorophenol are reacted in 300 ml of xylene in the presence of 0.5 g of N,N-di-n-butylaminoacetonitrile. The reaction mixture was stirred at the boiling point of the toluene. The HCl gas produced was flushed by means of nitrogen out of the reaction mixture and collected in NaOH solution, which was titrated after the conclusion of the reaction. The reaction was complete within about 24 hours.

The product was obtained in the from of a white crystalline material in a practically quantitative yield. M.p.: 260°–264° C.

|    | Theoretical | Found  |
|----|-------------|--------|
| C: | 35.99%      | 36.64% |
| H: | 0.86%       | 0.82%  |
| N: | 7.99%       | 7.77%  |
| Cl:| 50.7%       | 49.3%  |

EXAMPLE 2

2-chloro-4,6-di-(2,3,4,6-tetrachlorophenoxy)-s-triazine

In a three-neck bottle provided with agitator, condenser and dropping funnel, 92.2 g of cyanuric chloride and 231.9 g of 2,3,4,6-tetrachlorophenol were reacted in 1,200 ml of xylene with 1.5 g of N-methylpyrrolidine. The reaction mixture was stirred at the boiling point of the xylene. The HCl gas produced was flushed out of the reaction mixture by means of nitrogen and collected in NaOH solution. The reaction was complete in about 8 hours. The product was a white crystalline substance. M.p.: 235° C. Yield: about 95 percent.

|    | Theoretical | Found  |
|----|-------------|--------|
| C: | 31.3%       | 30.1%  |
| H: | 0.34%       | 0.50%  |
| N: | 7.29%       | 7.20%  |
| Cl:| 55.5%       | 54.9%. |

EXAMPLE 3

2-chloro-4,6-di-(2,4,5-trichlorophenoxy)-s-triazine

In a three-neck bottle provided with agitator, condenser and dropping funnel, 82 g of cyanuric chloride and 176 g of 2,4,5-trichlorophenol were brought together in 1,000 ml of xylene with 1.0 g of morpholinoacetic acid morpholide.

The reaction mixture was stirred at the boiling point of the xylene.

The HCl gas produced was flushed by nitrogen out of the reaction mixture and collected in NaOH solution. After completion of the liberation of the HCl, the reaction mixture was filtered off. The product was a white crystalline material. M.p.: 189°–190° C. Yield: 97 percent.

EXAMPLE 4

2-chloro-4,6-di-(pentachlorophenoxy)-s-triazine

In a three-neck bottle provided with agitator, condenser and feed tube, 18.44 g of cyanuric chloride and 53.3 g of pentachlorophenol are reacted in 300 ml of xylene with 0.5 g of tri-n-butylamine. The reaction mixture was stirred at the boiling point of the xylene. The HCl gas liberated was flushed by means of nitrogen out of the reaction mixture and collected in NaOH solution. The reaction was complete in about 2 hours. The product was obtained in the form of a white crystalline material in a yield of about 98 percent. M.p.: 326°–327° C.

|    | Theoretical | Found  |
|----|-------------|--------|
| C: | 27.95%      | 27.55% |
| N: | 6.52%       | 6.53%  |
| Cl:| 60.6%       | 59.88% |

EXAMPLE 5

2-chloro-4,6-di-(2,4,6-tribromophenoxy)-s-triazine

In a three-neck bottle provided with agitator, condenser and dropping funnel, 18.44 g of cyanuric chloride and 66.16 g of 2,4,6-tribromophenol were mixed in 300 ml of xylene with 0.5 g of N,N-dimethylaniline.

The reaction mixture was stirred at the boiling point of the xylene.

The HCl gas liberated was flushed by means of nitrogen out of the reaction mixture and collected in NaOH solution. After completion of the liberation of the HCl, the reaction mixture was filtered off. The crude product was obtained in the form of a white crystalline material in almost quantitative yield. M.p.: 176°–200° C. Recrystallized from benzene (boiling range 150°–165° C). M.p.: 200°–204° C.

EXAMPLE 6

2,4-di-(diethylamine)-6-pentachlorophenoxy-s-triazine

In a three-neck bottle provided with agitator, condenser and feed tube, 19.79 g of 2,4-di-(diethylamine)-6-chloro-triazine in 0.5 ml of tri-n-butylamine and 20.4 g of pentachlorophenol in 300 ml of toluene were brought together. The reaction mixture was stirred at the boiling point of the toluene.

The HCl gas liberated was washed by means of nitrogen from the reaction mixture and collected in NaOH solution. The reaction was complete in about 24 hours. The toluene was completely removed and the sticky residue was stirred with a small amount of pentane, whereupon the mass crystallized. M.p.: 107°–112° C. Recrystallized from cyclohexane: M.p.: 117°–119° C.

EXAMPLE 7

2-n-butylamine-4,6-di-(pentachlorophenoxy)-s-triazine

In a three-neck bottle provided with agitator, condenser and feeding tube, 22 g of 2-n-butylamine-4,6-dichloro-s-triazine, 53 g of pentachlorophenol and 0.5 ml of N,N-diisobutylaminoacetonitrile were reacted in 300 ml of xylene. The reaction mixture was stirred at the boiling point of the xylene. The HCl gas liberated was flushed out of the reaction mixture by means of nitrogen.

The reaction was complete in about 20 hours. The precipitate which had formed was filtered off. M.P.: 240°–241° C.

|    | Calculated | Found |
|----|------------|-------|
| C: | 33.7%      | 33.5% |
| H: | 1.48%      | 1.6%  |
| N: | 8.3%       | 8.1%  |
| Cl:| 51.7%      | 51.3% |

EXAMPLE 8

In a manner similar to Example 1, 24.1 g of 2-anilido-4,6-dichloro-s-triazine, 53.3 g of pentachlorophenol were reacted in the presence of N,N-di-n-butylbenzoamide as catalyst. The reaction was complete in about 24 hours. The precipitated product had a m.p. of 262° C; yield: 96 percent.

EXAMPLE 9

In a manner similar to Example 1, 92.2 g of cyanuric chloride and 231 g of tetrachlorophenol and 1.5 g of N,N,N',N'-tetra-n-butyladipic acid amide as catalyst were reacted. The product which precipitated out had an m.p. of 235° C, yield: 97 percent.

EXAMPLE 10

In a manner similar to Example 4, 18.44 g of cyanuric chloride, 53.3 g of pentachlorophenol and 0.5 g of N,N-di-n-propyl hexanoic acid amide as catalyst were reacted. The product which precipitated had an m.p. of 325° C; yield: 92 percent.

EXAMPLE 11

In a manner similar to Example 4, 18.4 g of cyanuric chloride, 53.3 g of pentachlorophenol, and 0.5 g of hexamethyl phosphorous acid amide as catalyst were reacted in 300 ml of xylene. After completion of the liberation of HCl, the product deposited in the form of a white precipitate. M.p.: 322° C; yield about 90 percent.

EXAMPLE 12

In a manner similar to Example 3, 41 g of cyanuric chloride, 88 g of 2,4,6-trichlorophenol and 0.5 g of methylene aminoacetonitrile as catalyst were reacted. After termination of the liberation of HCl, the reaction mixture was filtered off; the product melts at 188° C; yield about 90 percent. The attached drawing illustrates the liberation of HCl in relation to time of reaction of 18.4 g of cyanuric chloride and 53.3 g of pentachlorophenol in 200 ml of boiling xylene without a catalyst (curve 1); in the presence of 1 percent of weight of N,N-di-n-butyl benzoic acid amide (curve 2); of 1 percent of weight of benzamide (curve 3); of 1 percent of weight of methylaminoacetonitrile (curve 4); of 1 percent of weight of N,N-dimethylaniline (curve 5); of 1 percent of weight of N,N,N', N', N'', N''hexamethyl phosphorous acid amide (curve 6); of 1 percent of weight of tri-n-butylamine (curve 7); and of 1 percent of weight of pyridine (curve 8). The curves 2 to 8 demonstrate the technical advance achieved by the catalysts used according to the invention.

What is claimed is:

1. In the process of producing halogenated phenoxy-s-triazines by the reaction of halogenated phenols with C-chloro-s-triazines in the liquid state at temperatures of 50° to 250° C; the improvement which comprises catalyzing said reaction with 0.1 to 20 mol percent, based upon the triazine reactant, of a member selected from the group consisting of formamide, methyl formamide, dimethyl formamide, acetamide, N,N-dimethyl acetamide, propionic acid amide, butyric acid amide, N,N-di-n-propyl-butyramide, N,N-di-isopropyl-butyramide, N,N-di-n-butyl butyramide, N,N-di-isobutyl butyramide, N-benzyl butyramide, N,N-dipropyl-2-ethyl hexanoamide, caproamide, 2-ethyl hexanoamide, caprylamide, acetoacetic acid-N,N-di-n-butyramide, acetoacetic acid anilide, benzoic acid benzylamide, lauramide, palmitamide, stearamide, benzoamide, phenylacetamide, pyruvamide, acetoacetamide, levulamide, N,N-dimethyl benzoamide, N,N-di-formyl hexamethylene diamine, dimethyl barbituric acid, diethyl barbituric acid, dipropyl barbituric acid, diallyl barbituric acid, di-n-butyl barbituric acid, phenylethyl barbituric acid, triethyl amine, trimethylamine, triisopropylamine, triisobutylamine, monoethyl diisopropyl amine, monoethyl-di-n-butyl amine, tri-n-butylamine, N,N,N',N'-tetramethyl butane diamine-(1,4), N,N,N',N'-tetramethyl ethylene diamine, β-chloro-propyl di-propylamine, tris-(β-ethoxyethyl)-amine, methyl amino acetonitrile, N,N-di-n-butyl aminoaceto nitrile, N,N-diisopropylamino acetonitrile, N-n-butyl-N-methyl-amino-acetonitrile, methylene aminoacetonitrile, N,N-diisobutyl amino propionitrile, β-dimethylamino propionitrile, dimethylamino acetonitrile, dimethyl-p-amino-benzonitrile, N,N-dimethyl-cyclohexylamine, N,N-dimethyl aniline, N,N-diethyl aniline, p-bromophenyl dimethylamine, 2,4-dinitrophenyl dimethyl amine, benzyl dimethyl amine, p-nitrophenyl-di-n-butyl amine, N-(2,4-dichlorophenyl)-diethyl amine, N,N,N',N'-tetramethyl benzidine, N-n-butyl morpholine, N-phenyl-morpholine, N-(p-methyl phenyl)-morpholine, morpholine acetic acid-morpholide, tetrahydroisoquinoline, N-n-propyl-tetrahydro-quinoline, N-phenyl-tetrahydro isoquinoline, N-methyl-pyrolidine, N-n-butylpyrrolidine, N-phenyl-pyrrolidine, pyridine, isoquinoline, pyrazine, oxazine, quinazoline, oxazol, oxadiazol, benzothiazol, hexamethyl phosphoric acid amide, hexa-n-butyl phosphorus acidamide, hexa-isobutyl phosphorous acid amide, phosphorous acid trimorpholide, diisopropoxy titanium diamide, di-n-butyl tin diamide, diisobutyl tin diamide, 4-sulfamoyl acetaniline, N-amidinosulfanilamide, N-2-pyridyl-sulfanilamide and quaternary ammonium salts thereof.

2. The improved process claimed in claim 1, carried out at a temperature of about 80° to 200°C.

3. Improved process claimed in claim 1, carried out at pressure of about atmospheric to about 12 atmospheres gauge.

4. Improved process claimed in claim 1, wherein said catalyst is present in a proportion of about 0.1 to 2 mol percent.

5. Improved process claimed in claim 1, wherein said reaction is carried out in a solvent.

6. Improved process claimed in claim 1, wherein said reaction is carried out in the melt.

7. Improved process claimed in claim 5, wherein said solvent is a member of the group consisting of isoactane fractions having a boiling range of about 120° to 200° C, benzene fractions having a boiling range of about 120° to 200° C benzene, toluene, xylene, o-dichlorobenzene, nitrobenzene, diisopropylether, diisoamylether, dimethylether of ethylene glycol, dimethyl ether of diethylene glycol, diphenyl ether 1,4-dioxane, dimethyl sulfoxide and dimethyl formamide.

8. Improved process claimed in claim 1, wherein said halogenated phenol is monohydric.

9. Improved process claimed in claim 1, wherein said halogenated phenol is a member selected from the group consisting of 4-fluorophenol, pentafluorophenol, 2-chlorophenols, 3-chlorophenols, 4-chlorophenols, 2,3-dichlorophenols, 2,4-dichlorophenols, 2,5-dichlorophenols, 2,6-dichlorophenols, 3,4-dichlorophenols, 3,5-dichlorophenols, 2,4-dichloro-6methylphenol, 2,6-dichloro-4-tert.-butylphenol, 2,3,5-trichlorophenols, 2,4,5-trichlorophenols, 2,4,6-trichlorophenols, 2,3,4,6-tetrachlorophenol, pentachlorophenol, 2-bromophenols, 3-bromophenols, 4-bromophenols, 2,4-dibromophenols, 2,6-dibromophenols, 2,4,6-tribromophenol, pentabromophenol, 2,4-diiodophenols, 2,6-diiodophenols, 2,4,6-triiodophenol, 1-hydroxy-2,4-dibromonapthaline and 8-hydroxy-5,7-dibromoquinoline.

10. Improved process claimed in claim 1, wherein said triazine reactant is a member selected from the group consisting of cyanuric chloride, 2-anilido-4,6-dichloro-s-triazine, 2,4-di-(diethylamino)-6-chloro-s-triazine, 2-n-butyl-amino-4,6-dichloro-s-triazine, 2-cyclohexylamino-4,6-dichloro-s-triazine, 2-n-octylamino-4,6-dichloro-s-triazine, 2-mopholino-4,6-dichloro-s-triazine, 2-ethoxy-ethylamino-2,4-dichloro-s-triazine, 2-piperidino-2,4-dichloro-s-triazine and 2-α-napthylamino-2,4-dichloro-s-triazine.

* * * * *

UNITED STATES PATENT OFFICE
CERTIFICATE OF CORRECTION

Patent No. 3,682,908          Dated   August 8, 1972

Inventor(s)   Roshdy Ismail

It is certified that error appears in the above-identified patent and that said Letters Patent are hereby corrected as shown below:

Column 1, line 61, -- C -- should be inserted before "chlorides". Column 4, line 51, "esters" should read -- ethers -- . Column 7, line 38, -- s--- should be inserted following "6-chloro-". Column 9, line 2, "Ncdi" should read -- N,N-di -- .

Signed and sealed this 29th day of May 1973.

(SEAL)
Attest:

EDWARD M. FLETCHER, JR.
Attesting Officer

ROBERT GOTTSCHALK
Commissioner of Patents